Dec. 28, 1926.    1,612,367
N. FULTON
PIE LIFTER
Filed April 6, 1926

NELL FULTON INVENTOR.

BY Emil F. Lange
ATTORNEYS.

Patented Dec. 28, 1926.

1,612,367

UNITED STATES PATENT OFFICE.

NELL FULTON, OF NEW YORK, N. Y.

PIE LIFTER.

Application filed April 6, 1926. Serial No. 100,076.

My invention relates to kitchen and dining room utensils, the specific device being intended to serve primarily to loosen and remove pies from pie tins after baking, and especially to handle the pies during and after their removal from the pie tins. It is my object to provide a pie remover which may be made at a very low cost and which will be effective both for loosening the pie and for removing it from the pie tin either entire or in pieces.

Having in view these objects and others which will be mentioned in the following description, we will now refer to the drawings, in which—

Figure 4:
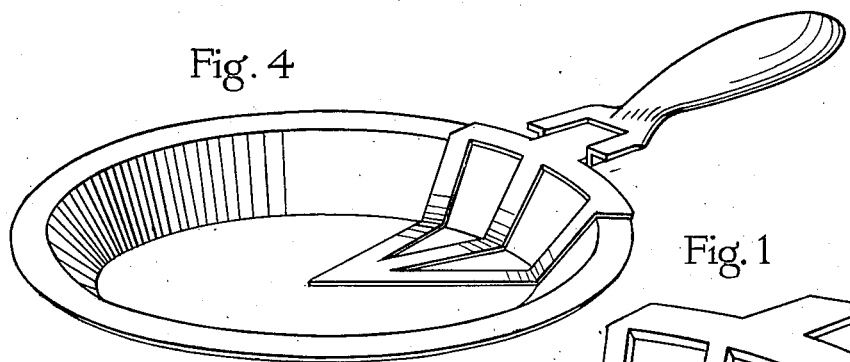
Figure 4 shows the pie remover, handle and the pie tin all in their relation to each other.

In its simplest form the pie lifter has one portion 10 in the shape of a sector, an upwardly and outwardly inclined portion 11 and a horizontal portion 12, the horizontal portion being provided with a tongue 13. The entire device is made from a single piece of sheet metal which is cut into sector form and then bent along arcuate lines which form the division lines between the parts 10 and 11 and the parts 11 and 12. The tongue 13 is of course integral with the portion 12.

Figure 1:
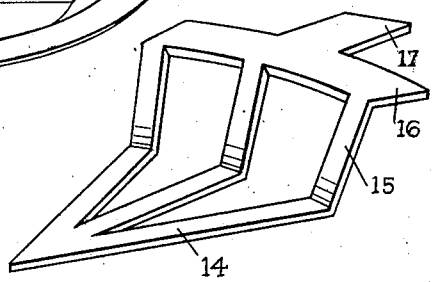
Figure 1 is an illustration of my pie remover in its preferred form.
Figure 2:
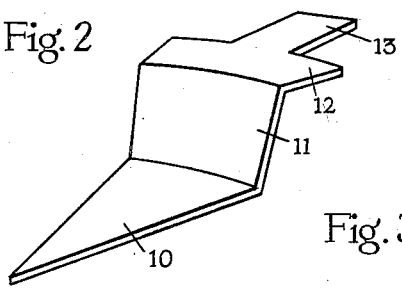
Figure 2 is an illustration of a modified form of my pie remover.

My preferred form of pie lifter is shown in Figure 1 and it differs from that above described in that it is in spider form. The base 14 in this case consists of a plurality of strips each connected with an upwardly and outwardly inclined strip, these latter strips constituting the part 15. The strips 15 are integrally connected to the part 16 which corresponds to the part 12 of the Figure 2 construction. There is also provided a tongue 17 integral with the part 16.

The dimensions of the various parts above described relative to the dimensions of the parts of the pie tin are important. The parts 10 and 14 must have such a length that the apex will be at the center of the pie tin when the pie lifter is properly positioned therein. The parts 11 and 15 must have a height equal to that of the side walls of the pie tin and the parts 12 and 16 must be such that they will rest on the upper edge of the pie tin without hanging over that edge. The positions of all of these parts with relation to the pie tin are shown in the Figure 4.

Figure 3:
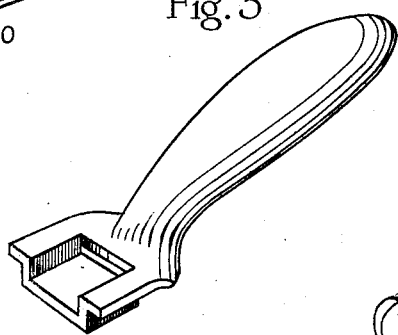
Figure 3 is a view in perspective of the detachable handle for the pie remover.
Figure 5:
Figure 5 is an illustration showing the manner of loosening the pie.
Figure 6:
Figure 6 shows how the pie lifter may be used while lifting a slice of pie from the pie tin.

In use the device above described is placed in the pie tin and then covered with the pie material. When it is desired to serve the pie after baking, the handle shown in Figure 3 is first secured to the tongue 13 or 17. The construction of this handle will be apparent from the illustration. The handle is then swung around, carrying the device through a complete revolution which separates the pie crust from all contact with the pie tin. After the pie has been separated from the tin the entire pie may be lifted out from the tin by lifting on the handle. If it is desired to first cut the pie into pieces, the device may be used as a guide for cutting pieces of uniform size and the pieces may then be lifted out as in Figure 6 in a perfectly sanitary manner.

Aside from the great convenience of the device, the sanitary features are of prime importance. It is possible to lift either the entire pie or a piece of the pie out of the tin and to serve it at the table without once touching it with the fingers. The device is made from sheet metal with a perfectly smooth surface so that it may be easily cleaned. The pie lifter is entirely removable from the pie tin, which makes it possible to keep both the pie tin and the lifter in a sanitary condition. Were the lifter secured to the pie tin, as in many of the prior devices, it would leave inaccessible places which could not be reached with the brush or cloth. The device is so held in the pie tin that the movement of the handle will cause the pie lifter to detach the pie from contact with the pie tin at all points and without the use of a pivot. My device has the further advantage over the pivoted devices in that it can be used as a lifter and not merely as a separator.

Having thus described my invention in such full, clear, and exact terms that its construction and operation will be readily understood by others skilled in the art to which it pertains, what I claim as new and desire to secure by Letters Patent of the United States is:

1. A pie remover comprising a base in sector form, a side wall having the height and inclination of the side walls of a pie tin, the vertex of said base being at the center of the pie tin when the said side wall is flush with the side wall of the pie tin, a horizontal flange which is adapted to rest on the edge of the pie tin, and a tongue integral with and extending radially outward from said horizontal flange.

2. A pie remover for lifting pies from pie tins, said pie remover comprising a base which is adapted to rest on the inner bottom surface of the pie tin during the baking of the pie, said base being in the form of a sector of such diameter that its vertex will be at the center of the bottom surface of the pie tin, a side wall integral with said base and inclined at such an angle that it will be flush against the side of the pie tin, a horizontal flange on said pie remover, said flange being adapted to rest on the upper edge of the pie tin, and a handle which is adapted to be detachably secured to said flange, said pie remover being adapted to serve as a support for the pie during and after its removal from the pie tin.

In testimony whereof I affix my signature.

NELL FULTON.